(12) United States Patent
Feng et al.

(10) Patent No.: US 11,326,995 B2
(45) Date of Patent: May 10, 2022

(54) MULTI-FUNCTIONAL TRUE TRIAXIAL SHEAR TEST DEVICE AND METHOD FOR HARD ROCKS WITH HIGH TEMPERATURE AND HIGH PRESSURE

(71) Applicant: Northeastern University, Shenyang (CN)

(72) Inventors: Xiating Feng, Shenyang (CN); Jun Zhao, Shenyang (CN); Jun Tian, Shenyang (CN); Chengxiang Yang, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 175 days.

(21) Appl. No.: 16/965,521

(22) PCT Filed: Sep. 26, 2019

(86) PCT No.: PCT/CN2019/108106
§ 371 (c)(1),
(2) Date: Jul. 28, 2020

(87) PCT Pub. No.: WO2021/056322
PCT Pub. Date: Apr. 1, 2021

(65) Prior Publication Data
US 2021/0247283 A1   Aug. 12, 2021

(30) Foreign Application Priority Data
Sep. 24, 2019  (CN) .......................... 201910904135.3

(51) Int. Cl.
*G01N 3/10* (2006.01)
*G01N 3/18* (2006.01)
(Continued)

(52) U.S. Cl.
CPC ................. *G01N 3/24* (2013.01); *G01N 3/12* (2013.01); *G01N 2203/0048* (2013.01); *G01N 2203/0256* (2013.01)

(58) Field of Classification Search
CPC combination set(s) only.
See application file for complete search history.

(56) References Cited

U.S. PATENT DOCUMENTS 8,770,038 B2 * 7/2014 Secq .................. G01N 3/24
73/783
10,048,183 B2 * 8/2018 Ni ......................... G01N 3/08

FOREIGN PATENT DOCUMENTS

CN     201852748 U    6/2011
CN     103969107 A    8/2014
(Continued)

*Primary Examiner* — Brandi N Hopkins
(74) *Attorney, Agent, or Firm* — Muncy, Geissler, Olds & Lowe, PC

(57) ABSTRACT

The invention provides a multi-functional true triaxial shear test device and method for hard rocks, the device comprises a hydraulic system, a left-end combination tangential loading oil cylinder, a right-end combination tangential loading oil cylinder, a front-end combination lateral loading oil cylinder, a rear-end combination lateral loading oil cylinder, an upper normal loading oil cylinder, a lower normal loading oil cylinder, an annular framework, a lateral auxiliary push-and-pull framework, an annular framework support platform, a horizontal support platform and a test chamber. The stiffness of the device is improved, and besides, a total section stress covering loading manner of the rock samples in a shear process is guaranteed. Through improving a temperature reduction manner of front ends of the oil cylinders, the situation that high temperature does not enable the temperature of hydraulic oil in the oil cylinders to rise to affect normal motion of the actuator can be guaranteed.

9 Claims, 8 Drawing Sheets

(51) Int. Cl.
*G01N 3/24* (2006.01)
*G01N 3/12* (2006.01)

(56) References Cited

FOREIGN PATENT DOCUMENTS

| | | |
|---|---|---|
| CN | 106769542 A | 5/2017 |
| CN | 206420735 U | 8/2017 |
| JP | 2015090355 A | 5/2015 |

* cited by examiner

MULTI-FUNCTIONAL TRUE TRIAXIAL SHEAR TEST DEVICE AND METHOD FOR HARD ROCKS WITH HIGH TEMPERATURE AND HIGH PRESSURE

BACKGROUND OF THE INVENTION

1. Field of the Invention

The present invention relates to a rock loading test device and method, in particular to a multi-functional true triaxial shear test device and method for hard rocks with high temperature and high pressure.

2. The Prior Arts

The bearing capacity of rocks as a natural carrier of underground mining, deep-buried tunnels, nuclear waste disposal depots and the like directly affects the normal operation of engineering and is the important guarantee for personnel safety. Underground rock mass are not complete, and structural surfaces, faults and the like being low in bearing capacity exit to different extent. Under the action of high shear stress, the rock mass containing structural surfaces easily form engineering disasters of earthquakes, landslides, deep cracking, time delayed rockburst. Therefore, researching on failure mechanism of the hard rocks containing structural surfaces has important significance in understanding and preventing the occurrence of the engineering disasters.

It is well known that the underground rock mass are affected by true triaxial stress ($\tau > \sigma_p > \sigma_n$), and in general, rock mass are easier to failure when the structural surfaces are perpendicular to the minimum principal stress direction ($\sigma_n$). At present, mainly a conventional direct shearing method ($\tau > \sigma_n$, $\sigma_p = 0$) is used for the hard rock shear test, and used rock samples are generally cuboids. During a conventional direct shear test, the rock samples are divided into an upper part and a lower part along the center line of the shear direction. During the test process, only half of the cross-sections of the rock samples in the shear direction are under stress, and the other half of the cross-sections are in the free state. Moreover, the lateral stress ($\sigma_p = 0$) is assumed to be the minimum principal stress. These do not conform to the three-dimensional stress state in which the underground rock mass containing structural surfaces are broken. In addition, the structural surfaces far away from the free surface of a tunnel are limited by the surrounding rock mass and are often under the condition of constant normal stiffness. At present, the shear test method includes a constant normal stress or constant normal stiffness test under the quasi-static-state and a constant normal stress shear test under the long-term creep loading. But a time-dependent shear test under constant normal stiffness has not been realized by test equipment. This is mainly because that the constant normal stiffness test needs a cooperative mode of a hydraulic oil pump and an electro-hydraulic servo valve, a normal piston is subjected to high-frequency adjustment and control, however, the temperature of an oil source is easy to raise in this manner, and the life of an oil source system is easy to reduce after long-time operation.

In addition, as the depth of the underground rock mass engineering is deeper and deeper, temperature also plays a major role on rock failure. It is generally believed that for every 100 meters increase in depth, the temperature of the rock mass can increase by 3° C., and the temperature of the position being about 5000 meters underground reaches about 180° C. Temperature is one of the most important factors affecting deformation and breaking of deep hard rocks.

At present, conventional shear test machines mostly include a stand column type and a pull rod type framework, the framework is low in stiffness. The framework easily accumulates enough elastic strain energy in the test, and post-peak elastic strain energy is released. As a result, the rock is prone to sudden brittle failure in the post-peak curve. In addition, an existing true triaxial equipment hydraulic cylinder can only provide a constant force in each direction, and cannot perform rock cross-section full-coverage loading in a shear process.

SUMMARY OF THE INVENTION

A primary objective of the present invention is to provide a multi-functional true triaxial shear test device and method for hard rocks with high temperature and high pressure. Up to 1200 MPa of high stress can be applied, the highest temperature can reach 250° C., a quasi-static-state time-dependent shear test for hard rocks at high temperature and high pressure under true triaxial constant normal stress/stiffness is realized for the first time, the stiffness of the device is guaranteed, and at the same time, loading is applied onto the full cross sections of the rock samples; and by a method of performing heating in a high-temperature tank and lowering temperature at the front end of an actuator, a hard rock shear failure process under true high-temperature and high three-dimensional stress condition is carried out in laboratory.

To achieve the above objectives, the present invention provides a multi-functional true triaxial shear test device for hard rocks with high temperature and high pressure comprises a hydraulic system, a left-end combination tangential loading oil cylinder, a right-end combination tangential loading oil cylinder, a front-end combination lateral loading oil cylinder, a rear-end combination lateral loading oil cylinder, an upper normal loading oil cylinder, a lower normal loading oil cylinder, an annular framework, a lateral auxiliary push-and-pull framework, an annular framework support platform, a horizontal support platform and a test chamber.

Wherein the annular framework is fixedly mounted on an upper surface of the annular framework support platform through bolts, the horizontal support platform is arranged at a rear end of the annular framework support platform, and the horizontal support platform and the annular framework support platform are both fixedly mounted on a ground.

Wherein the lateral auxiliary push-and-pull framework is arranged on the horizontal support platform through a guide rail and a sliding block.

Wherein the left-end combination tangential loading oil cylinder is mounted in a left-end through hole of the annular framework, the right-end combination tangential loading oil cylinder is mounted in a right-end through hole of the annular framework, the upper normal loading oil cylinder is arranged in an upper-end through hole of the annular framework, and the lower normal loading oil cylinder is arranged in a lower-end through hole of the annular framework.

Wherein the front-end combination lateral loading oil cylinder is mounted in a front-end through hole of the lateral auxiliary push-and-pull framework, and the rear-end combination lateral loading oil cylinder is arranged in a rear-end through hole of the lateral auxiliary push-and-pull framework.

Wherein a plurality of displacement sensors are respectively arranged at a rear end of the left-end combination tangential loading oil cylinder, a rear end of the right-end combination tangential loading oil cylinder, a rear end of the front-end combination lateral loading oil cylinder, a rear end of the rear-end combination lateral loading oil cylinder and a rear end of the upper normal loading oil cylinder.

Wherein the left-end combination tangential loading oil cylinder, the right-end combination tangential loading oil cylinder, the front-end combination lateral loading oil cylinder, the rear-end combination lateral loading oil cylinder, the upper normal loading oil cylinder and the lower normal loading oil cylinder are respectively connected with the hydraulic system.

Wherein the test chamber is mounted in a rectangular through hole of the lateral auxiliary push-and-pull framework, a shear box is placed in the test chamber, and rock samples are placed in the shear box.

Preferably, the left-end combination tangential loading oil cylinder comprises a left tangential upper loading oil cylinder and a left tangential lower loading oil cylinder, and the left tangential lower loading oil cylinder is coaxially mounted on the left tangential upper loading oil cylinder; wherein the right-end combination tangential loading oil cylinder comprises a right tangential upper loading oil cylinder and a right tangential lower loading oil cylinder, and the right tangential upper loading oil cylinder is coaxially mounted on the right tangential lower loading oil cylinder; wherein the left tangential upper loading oil cylinder and the right tangential lower loading oil cylinder are the same in structure, and both consist of a first sealing cover, a first piston, a first connecting plate, a first force measuring sensor and a first force transmitting plate; wherein each first piston is arranged in an inner cavity of the corresponding first sealing cover, each first piston is connected with one end of the corresponding first connecting plate, the other end of the first connecting plate is connected with one end of the corresponding first force measuring sensor, and the other end of the first force measuring sensor is connected with the corresponding first force transmitting plate; wherein the left tangential lower loading oil cylinder and the right tangential upper loading oil cylinder are the same in structure and both consist of a second sealing cover, a second counterforce cylinder barrel, a second piston, a second sealing flange, a second force measuring sensor and a second force transmitting plate; and wherein each second sealing cover is coaxially mounted on an outer peripheral surface of the corresponding first piston, a boss at one end of each second sealing cover extends into the inner cavity of the corresponding first sealing cover to be in connection with the corresponding first sealing cover in a sealed manner, each second piston and the corresponding second counterforce cylinder barrel are coaxially mounted at the other end of the corresponding second sealing cover, each second counterforce cylinder barrel is coaxially mounted on an outer peripheral surface of the corresponding second piston and is fixedly mounted on the corresponding second sealing cover through bolts, an extending end of each second piston is connected with one end of the second sealing flange, the other end of the second sealing flange is connected with one end of the corresponding second force measuring sensor, the other end of the second force measuring sensor is connected with the second force transmitting plate, and each first force transmitting plate penetrates through the corresponding second force transmitting plate.

Preferably, the front-end combination lateral loading oil cylinder comprises a front lateral upper loading oil cylinder and a front lateral lower loading oil cylinder, and the front lateral lower loading oil cylinder is coaxially mounted at an inner cavity of the front lateral upper loading oil cylinder; wherein the rear-end combination lateral loading oil cylinder comprises a rear lateral upper loading oil cylinder and a rear lateral lower loading oil cylinder, and the rear lateral lower loading oil cylinder is coaxially mounted at an inner cavity of the rear lateral upper loading oil cylinder; wherein the front lateral upper loading oil cylinder and the rear lateral upper loading oil cylinder are the same in structure and both consist of an upper lateral sealing cover, an upper lateral counterforce cylinder barrel, an upper lateral piston, an upper lateral sealing flange, an upper lateral force measuring sensor and an upper lateral force transmitting plate; wherein each upper lateral piston is coaxially mounted at a first boss of the corresponding upper lateral sealing cover, each upper lateral counterforce cylinder barrel is coaxially mounted at a second boss of the corresponding upper lateral sealing cover, an inner surface of each upper lateral counterforce cylinder barrel is in contact with an outer surface of the corresponding upper lateral piston, each upper lateral piston is connected with one end of the corresponding upper lateral sealing flange, the other end of the upper lateral sealing flange is connected with one end of the corresponding upper lateral force measuring sensor, and the other end of the upper lateral force measuring sensor is connected with the corresponding upper lateral force transmitting plate; wherein the front lateral lower loading oil cylinder and the rear lateral lower loading oil cylinder are the same in structure and both consist of a lower lateral sealing cover, a lower lateral piston, a lower lateral connecting plate, a lower lateral force measuring sensor and a lower lateral force transmitting plate; and wherein one end of each lower lateral sealing cover extends into an inner cavity of the corresponding upper lateral sealing cover, a flange end of each lower lateral sealing cover is fixedly mounted on the corresponding upper lateral sealing cover through bolts, each lower lateral piston is mounted at an inner cavity of the corresponding upper lateral sealing cover, each lower lateral piston is located in a sealing cavity formed by the corresponding upper lateral sealing cover and the corresponding lower lateral sealing cover, a part of each lower lateral piston extends out of a boss in the corresponding upper lateral sealing cover, and is connected with one end of the corresponding lower lateral connecting plate, the other end of the lower lateral connecting plate is connected with one end of the corresponding lower lateral force measuring sensor, the other end of the lower lateral force measuring sensor is connected with the corresponding lower lateral force transmitting plate, and each lower lateral force transmitting plate penetrates through the corresponding upper lateral force transmitting plate.

Preferably, the upper normal loading oil cylinder consists of an upper normal sealing cover, an upper normal cylinder barrel, an upper normal piston, an upper normal connecting plate, an upper normal force measuring sensor and an upper normal force transmitting plate and wherein a flange end of the upper normal sealing cover is connected with a flange end of the upper normal cylinder barrel, the upper normal piston is arranged on an inner wall of the upper normal cylinder barrel, a part of the upper normal piston extends out of the upper normal cylinder barrel, and is connected with one end of the upper normal connecting plate, the other end of the upper normal connecting plate is connected with one end of the upper normal force measuring sensor, and the other end of the upper normal force measuring sensor is connected with the upper normal force transmitting plate.

Preferably, the lower normal loading oil cylinder consists of a lower normal sealing plate, a lower normal piston, a lower normal sealing flange, a lower normal connecting plate, a lower normal force measuring sensor and a lower normal force transmitting plate; and wherein the lower normal piston is arranged in an inner cavity of the lower normal sealing plate, a flange end of the lower normal sealing plate is connected with the lower normal sealing flange, a part of the lower piston extends out of the lower normal sealing flange, and is connected with one end of the lower normal connecting plate, the other end of the lower normal connecting plate is connected with one end of the lower normal force measuring sensor, and the other end of the lower normal force measuring sensor is connected with the lower normal force transmitting plate.

Preferably, two penetrating cooling water through holes are formed in a front end of a first force transmitting plate of the left-end combination tangential loading oil cylinder, two penetrating cooling water through holes are formed in a front end of a first force transmitting plate of the right-end combination tangential loading oil cylinder, two penetrating cooling water through holes are formed in a front end of an upper lateral force transmitting plate of the front-end combination lateral loading oil cylinder, two penetrating cooling water through holes are formed in a front end of an upper lateral force transmitting plate of the rear-end combination lateral loading oil cylinder, two penetrating cooling water through holes are formed in a front end of a lower lateral force transmitting plate of the front-end combination lateral loading oil cylinder, two penetrating cooling water through holes are formed in a front end of a lower lateral force transmitting plate of the rear-end combination lateral loading oil cylinder, two penetrating cooling water through holes are formed in a front end of an upper normal force transmitting plate of the upper normal loading oil cylinder, and two penetrating cooling water through holes are formed in a front end of a lower normal force transmitting plate of the lower normal loading oil cylinder; and wherein the cooling water through holes are connected with a cooling water device through rubber pipes.

Preferably, the hydraulic system comprises a first hydraulic station, a second hydraulic station, a third hydraulic station, a first energy accumulator, a second energy accumulator, a third energy accumulator and a plurality of servo valves; wherein the first hydraulic station is connected with the first energy accumulator through a high pressure resistant oil pipe, and the first energy accumulator is connected with a left tangential upper loading oil cylinder, a left tangential lower loading oil cylinder and the upper normal loading oil cylinder through the high pressure resistant oil pipe and the servo valves; wherein the second hydraulic station is connected with the second energy accumulator through a high pressure resistant oil pipe, and the second energy accumulator is connected with a right tangential upper loading oil cylinder, a right tangential lower loading oil cylinder and the lower normal loading oil cylinder through the high pressure resistant oil pipe and the servo valves; wherein the third hydraulic station is connected with the third energy accumulator through a high pressure resistant oil pipe, the third energy accumulator is connected with a front lateral upper loading oil cylinder and a front lateral lower loading oil cylinder and a rear lateral upper loading oil cylinder and a rear lateral lower loading oil cylinder through the high pressure resistant oil pipe and the servo valves; and wherein the first hydraulic station, the second hydraulic station and the third hydraulic station are the same in structure and all comprise a hydraulic pump and an oil tank, and an oil inlet of each hydraulic pump is connected with an oil outlet of the corresponding oil tank through the corresponding high pressure resistant oil pipe.

Through cooperative effects of the hydraulic pumps and the servo valves, high-frequency motion of the oil cylinders is guaranteed, and completion of a constant normal stiffness test is guaranteed. Besides, the hydraulic pumps are connected with a servo driver and cooling water in series, firstly, when pressure in the oil cylinders is reduced, the servo driver feeds back the pressure in the oil cylinders to the hydraulic pumps in real time, so that the hydraulic pumps work, the pressure in the oil cylinders is complemented, or else, the hydraulic pumps stop working. In addition, when the pressure in the oil cylinders is reduced, the energy accumulators can complement pressure for the oil cylinders continuously. In this manner, continuous temperature rise caused by work of the hydraulic pumps can be reduced, and completion of the long-time constant normal stiffness test can be guaranteed.

Preferably, the test chamber is a thermostatic chamber, and the rock samples in the shear box are heated in a ceramic radiation heating manner.

A multi-functional true triaxial shear test method for hard rocks with high temperature and high pressure for the device, comprising the following steps:

Step 1: loading the rock samples into the shear box, and mounting a deformation sensor between the rock samples and the shear box.

Step 2: putting the shear box loaded with the rock samples at a central position of the test chamber.

Step 3: pushing the lateral auxiliary push-and-pull framework to be away from the annular framework, and placing the test chamber at a central position of the lateral auxiliary push-and-pull framework.

Step 4: pushing the lateral auxiliary push-and-pull framework into the annular framework, and enabling the rock samples to be located at a geometric central position of the annular framework.

Step 5: completing centering and clamping of the rock samples through performing displacement control on a left tangential upper loading oil cylinder, a left tangential lower loading oil cylinder, a right tangential upper loading oil cylinder, a right tangential lower loading oil cylinder, a front lateral upper loading oil cylinder, a front lateral lower loading oil cylinder, a rear lateral upper loading oil cylinder, a rear lateral lower loading oil cylinder, the upper normal loading oil cylinder and the lower normal loading oil cylinder.

Step 6: starting a cooling water device, so that the cooling water can circulate in force transmitting plates of the left tangential upper loading oil cylinder, the left tangential lower loading oil cylinder, the right tangential upper loading oil cylinder, the right tangential lower loading oil cylinder, the upper normal loading oil cylinder and the lower normal loading oil cylinder.

Step 7: starting the test chamber, and presetting target temperature so that the temperature in the test chamber can reach the preset target temperature.

Step 8: starting a first hydraulic station, a second hydraulic station and a third hydraulic station, performing force control on the left tangential upper loading oil cylinder, the left tangential lower loading oil cylinder, the right tangential upper loading oil cylinder, the right tangential lower loading oil cylinder, the front lateral upper loading oil cylinder, the front lateral lower loading oil cylinder, the rear lateral upper loading oil cylinder, the rear lateral lower loading oil cylinder, the upper normal loading oil cylinder and the lower normal loading oil cylinder at constant loading rate through force control, so that values $\tau=\sigma_p=\sigma_n$ of six boundary surfaces of the rock samples under a hydrostatic pressure state are increased to a target value of normal stress $\sigma_{n1}$, wherein $\tau$ is shear stress, $\sigma_p$ is lateral stress, and σn is normal stress.

Step 9: performing servo control on the upper normal loading oil cylinder and the lower normal loading oil cylinder so as to guarantee the normal stress unchanged; and then performing force control on the left tangential upper loading oil cylinder, the left tangential lower loading oil cylinder, the right tangential upper loading oil cylinder, the right tangential lower loading oil cylinder, the front lateral upper loading oil cylinder, the front lateral lower loading oil cylinder, the rear lateral upper loading oil cylinder and the rear lateral lower loading oil cylinder at constant loading rate through force control, so that a stress of a shear surface and a stress of a lateral surface are increased to a target value of the lateral stress $\sigma_{p1}$.

Step 10: performing servo control on the front lateral upper loading oil cylinder, the front lateral lower loading oil cylinder, the rear lateral upper loading oil cylinder, the rear lateral lower loading oil cylinder, the upper normal loading oil cylinder and the lower normal loading oil cylinder so as to guarantee the lateral stress and the normal stress unchanged; and then performing force control on the left tangential upper loading oil cylinder, the left tangential lower loading oil cylinder, the right tangential upper loading oil cylinder and the right tangential lower loading oil cylinder at constant loading rate through force control, so that the stress of the shear surface is increased to a stress $\tau_0$ of primary rocks.

Step 11: performing servo control on the front lateral upper loading oil cylinder, the front lateral lower loading oil cylinder, the rear lateral upper loading oil cylinder, the rear lateral lower loading oil cylinder, the upper normal loading oil cylinder and the lower normal loading oil cylinder so as to guarantee the lateral stress and the normal stress unchanged; and besides, performing force control on the left tangential lower loading oil cylinder and the right tangential upper loading oil cylinder, so that a force bearing process of the rock samples in a shear direction is guaranteed, and a left lower cross section and the right upper cross section maintain the stress $\tau_0$ of the primary rocks; and then increasing shear force of the left tangential upper loading oil cylinder and the right tangential lower loading oil cylinder at constant loading rate through displacement control until the shear force reaches residual strength.

Step 12: recording displacement, force value data and a rock sample macroscopic breaking mode through a computer.

The multi-functional true triaxial shear test device for hard rocks with high temperature and high pressure according to the present invention has the beneficial effects:

Compared with the prior art, the multi-functional true triaxial shear test device for hard rocks with high temperature and high pressure has the advantages that a hard rock shear test under the true triaxial condition is realized for the first time. In order to meet the requirement of performing true triaxial test of rocks under the true triaxial condition, a loading framework and the oil cylinders having the brand-new structures are designed, the integral stiffness of the device is improved, and besides, a total cross section stress covering loading manner of the rock samples in the true triaxial shear process is guaranteed. Through improving a temperature lowering manner of the front ends of the oil cylinders, the situation that high temperature which is as high as 300° C. does not enable the temperature of hydraulic oil in the oil cylinders to rise to affect normal motion of the actuator can be guaranteed.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The following is a detailed description of a multi-functional true triaxial shear test device for hard rocks with high temperature and high pressure according to the present invention in combination with the drawings and specific embodiments.

Figure 1:
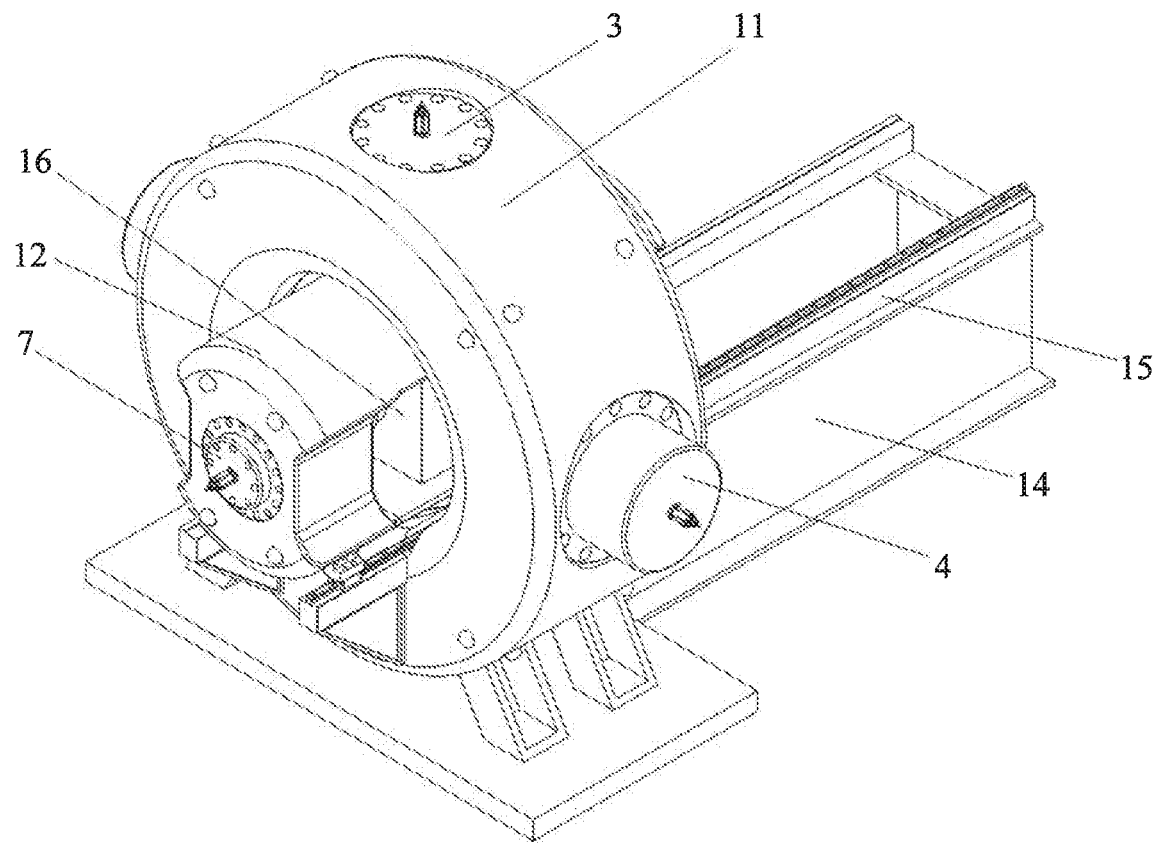
FIG. 1 is a stereogram of the structure of a multi-functional true triaxial shear test device for hard rocks with high temperature and high pressure according to the present invention.
Figure 2:
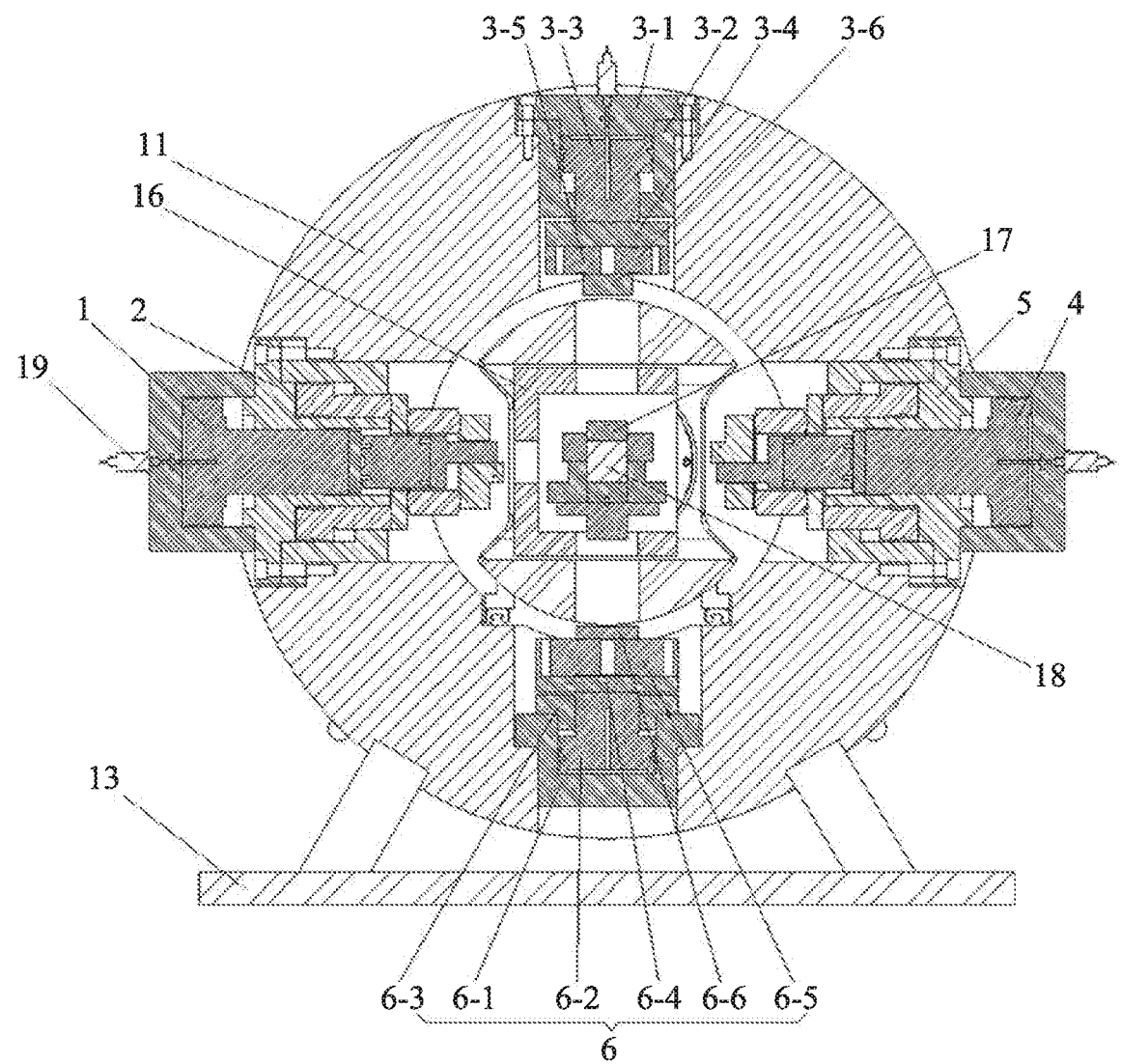
FIG. 2 is a front cross-sectional view of the multi-functional true triaxial shear test device for hard rocks with high temperature and high pressure according to the present invention.
Figure 3:
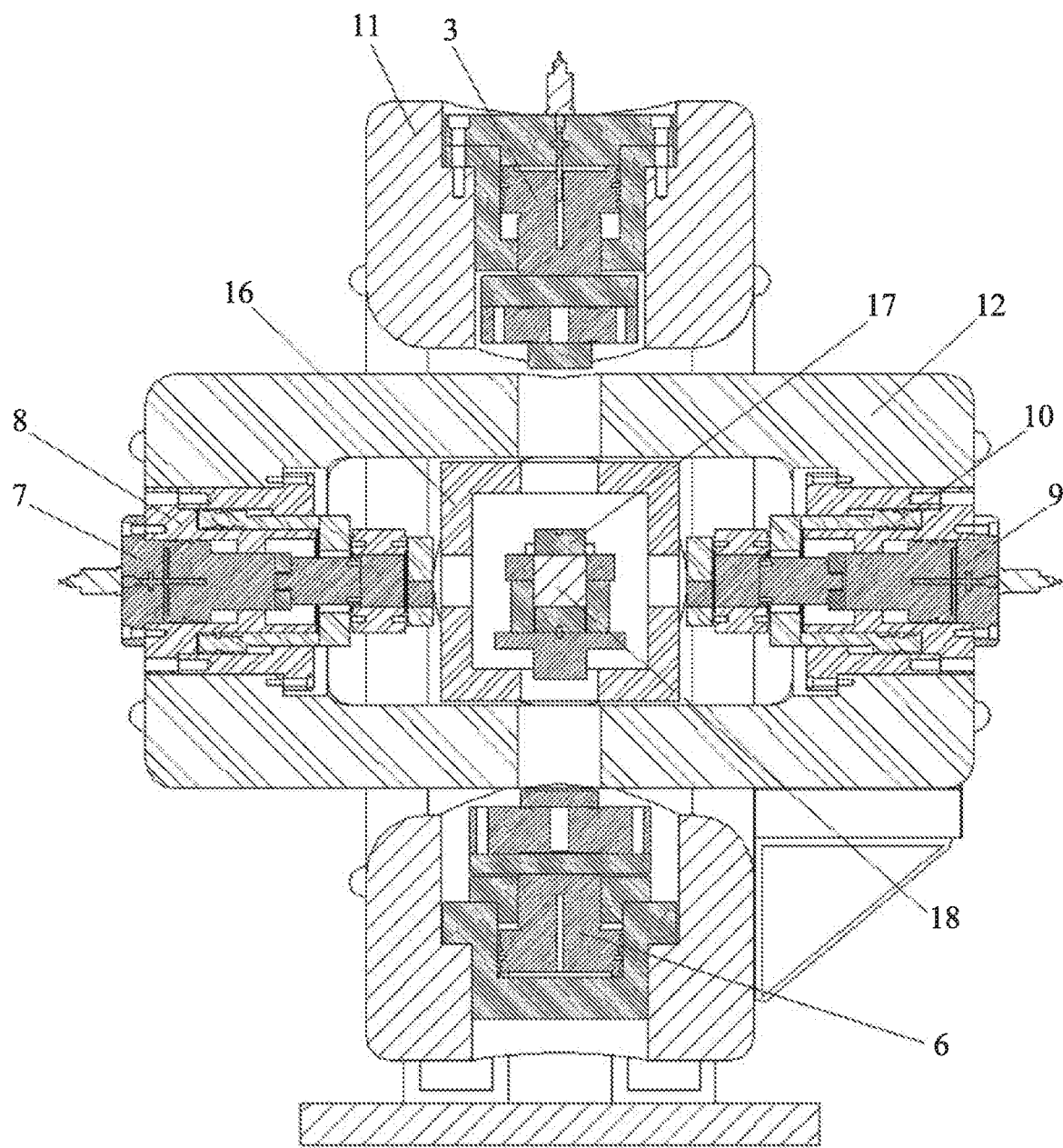
FIG. 3 is a lateral cross-sectional view of the multi-functional true triaxial shear test device for hard rocks with high temperature and high pressure according to the present invention.
Figure 7:
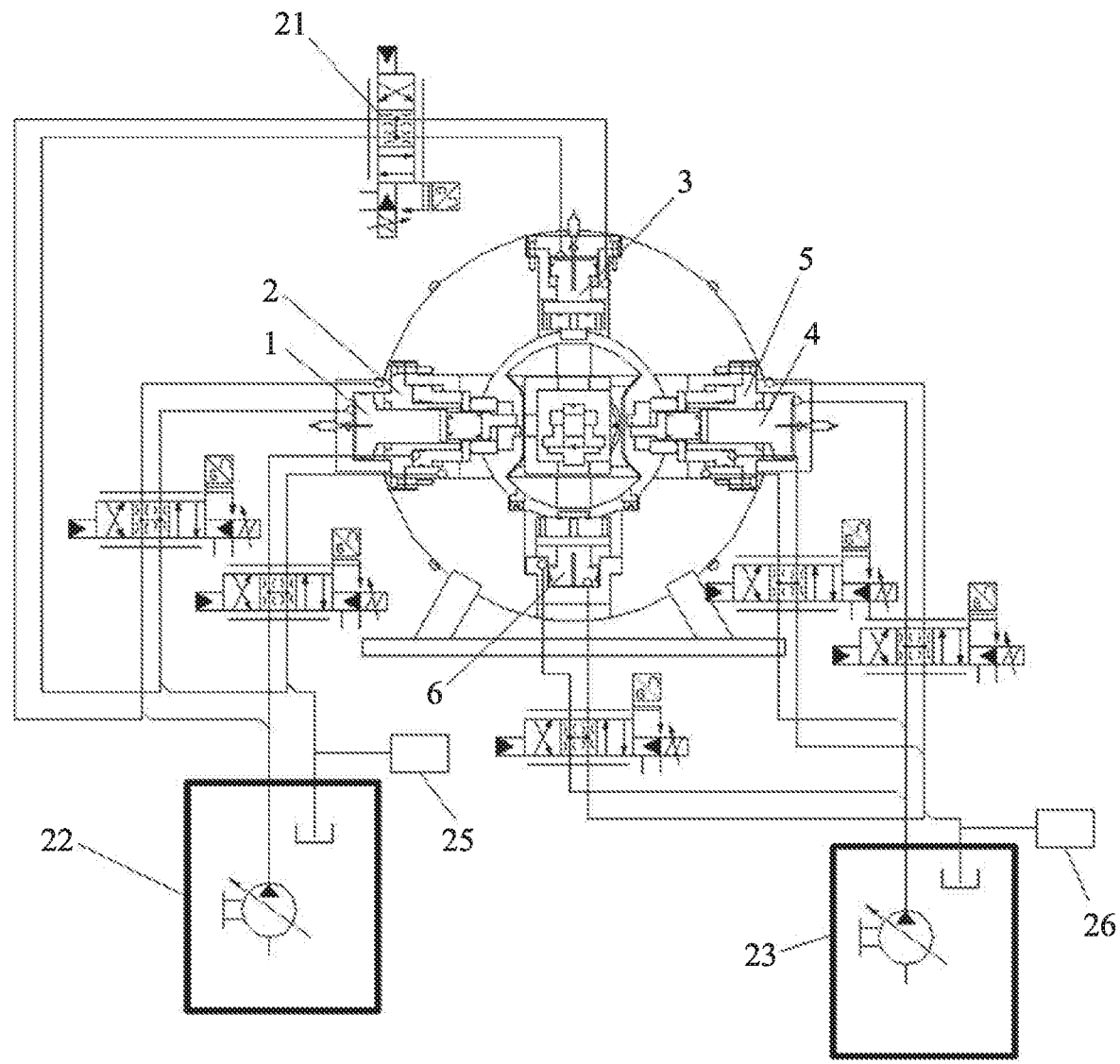
FIG. 7 is a front hydraulic principle view of the multi-functional true triaxial shear test device for hard rocks, with high temperature and high pressure according to the present invention.
Figure 8:
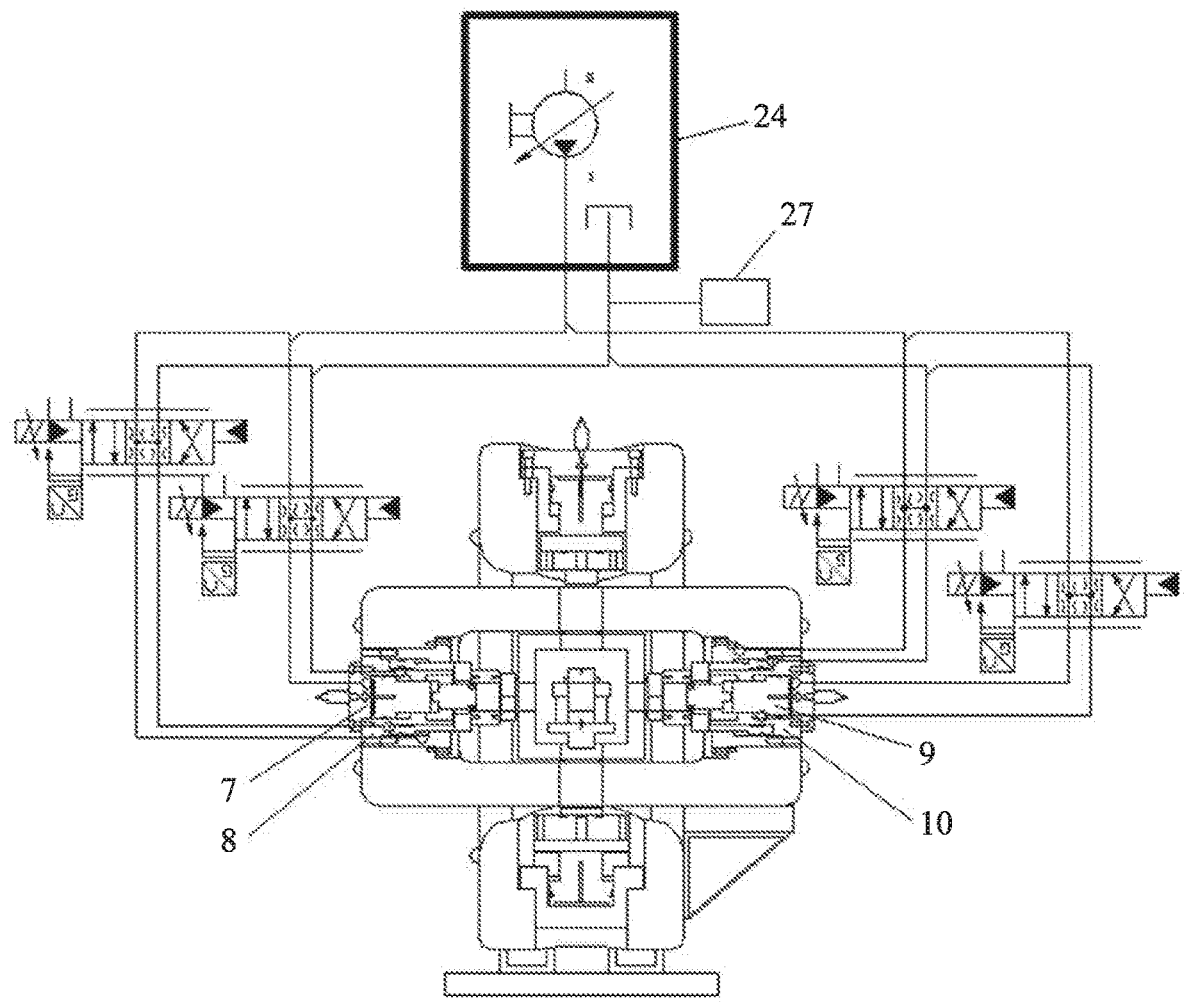
FIG. 8 is the lateral hydraulic principle view of the multi-functional true triaxial shear test device for hard rocks with high temperature and high pressure according to the present invention.

As shown in FIGS. 1-8, a multi-functional true triaxial shear test device for hard rocks with high temperature and high pressure comprises a hydraulic system, a left-end combination tangential loading oil cylinder, a right-end combination tangential loading oil cylinder, a front-end combination lateral loading oil cylinder, a rear-end combination lateral loading oil cylinder, an upper normal loading oil cylinder 3, a lower normal loading oil cylinder 6, an annular framework 11, a lateral auxiliary push-and-pull framework 12, an annular framework support platform 13, a horizontal support platform 14 and a test chamber 16. As shown in FIGS. 1 and 2, the annular framework 11 is fixedly mounted on an upper surface of the annular framework support platform 13 through bolts, the horizontal support platform 14 is arranged at a rear end of the annular framework support platform 13, and the horizontal support platform 14 and the annular framework support platform 13 are both fixedly mounted on the ground. The lateral auxiliary push-and-pull framework 12 is arranged on the horizontal support platform 14 through a guide rail 15 and a sliding block. Through the adoption of an annular structure framework which is integrally forged, the stiffness of the device is greatly improved. As shown in FIGS. 1-3, the left-end combination tangential loading oil cylinder is mounted in a left-end through hole of the annular framework 11, the right-end combination tangential loading oil cylinder is mounted in a right-end through hole of the annular framework 11, the upper normal loading oil cylinder 3 is arranged in an upper-end through hole of the annular framework 11, and the lower normal loading oil cylinder 6 is arranged in a lower-end through hole of the annular framework 11. As shown in FIGS. 1 and 3, the front-end combination lateral loading oil cylinder is mounted in a front-end through hole of the lateral auxiliary push-and-pull framework 12, and the rear-end combination lateral loading oil cylinder is arranged in a rear-end through hole of the lateral auxiliary push-and-pull framework 12. As shown in FIGS. 1-3, a plurality of displacement sensors 19 are respectively arranged at a rear end of the left-end combination tangential loading oil cylinder, a rear end of the right-end combination tangential loading oil cylinder, a rear end of the front-end combination lateral loading oil cylinder, a rear end of the rear-end combination lateral loading oil cylinder and a rear end of the upper normal loading oil cylinder 3, and the displacement sensors 19 are connected with a computer (not shown). As shown in FIGS. 7 and 8, the left-end combination tangential loading oil cylinder, the right-end combination tangential loading oil cylinder, the front-end combination lateral loading oil cylinder, the rear-end combination lateral loading oil cylinder, the upper normal loading oil cylinder 3 and the lower normal loading oil cylinder 6 are all connected with the hydraulic system. As shown in FIGS. 1-3, the test chamber 16 is mounted in a rectangular through hole of the lateral auxiliary push-and-pull framework 12, a shear box 17 is placed in the test chamber 16, and rock samples 18 are placed in the shear box 17.

Figure 4:
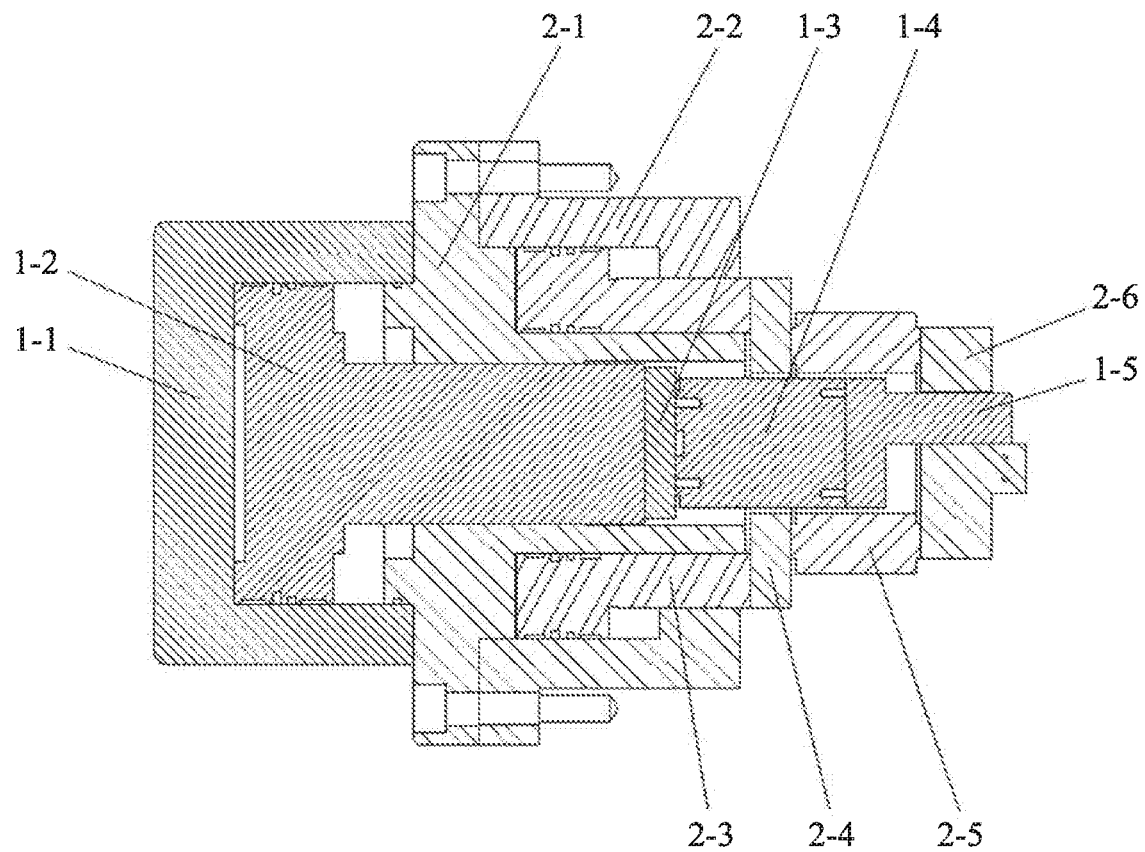
FIG. 4 is a schematic diagram of the structure of a left-end combination tangential loading oil cylinder of the multi-functional true triaxial shear test device for hard rocks with high temperature and high pressure according to the present invention.

As shown in FIG. 2, the left-end combination tangential loading oil cylinder comprises a left tangential upper loading oil cylinder 1 and a left tangential lower loading oil cylinder 2, and the left tangential lower loading oil cylinder 2 is coaxially mounted on the left tangential upper loading oil cylinder 1. As shown in FIG. 2, the right-end combination tangential loading oil cylinder comprises a right tangential upper loading oil cylinder 5 and a right tangential lower loading oil cylinder 4, and the right tangential upper loading oil cylinder 5 is coaxially mounted on the right tangential lower loading oil cylinder 4. As shown in FIG. 4, the left tangential upper loading oil cylinder 1 and the right tangential lower loading oil cylinder 4 are the same in structure, and both consist of a first sealing cover 1-1, a first piston 1-2, a first connecting plate 1-3, a first force measuring sensor 1-4 and a first force transmitting plate 1-5. Each first piston 1-2 is arranged in an inner cavity of the corresponding first sealing cover 1-1, each first piston 1-2 is connected with one end of the corresponding first connecting plate 1-3, the other end of the first connecting plate 1-3 is connected with one end of the corresponding first force measuring sensor 1-4, and the other end of the first force measuring sensor 1-4 is connected with the corresponding first force transmitting plate 1-5. As shown in FIG. 4, the left tangential lower loading oil cylinder 2 and the right tangential upper loading oil cylinder 5 are the same in structure and both consist of a second sealing cover 2-1, a second counterforce cylinder barrel 2-2, a second piston 2-3, a second sealing flange 2-4, a second force measuring sensor 2-5 and a second force transmitting plate 2-6, wherein each second sealing cover 2-1 is coaxially mounted on an outer peripheral surface of the corresponding first piston 1-2, a boss at one end of each second sealing cover 2-1 extends into the inner cavity of the corresponding first sealing cover 1-1 to be in connection with the corresponding first sealing cover 1-1 in a sealed manner, each second piston 2-3 and the corresponding second counterforce cylinder barrel 2-2 are coaxially mounted at the other end of the corresponding second sealing cover 2-1, each second counterforce cylinder barrel 2-2 is coaxially mounted on an outer peripheral surface of the corresponding second piston 2-3 and is fixedly mounted on the corresponding second sealing cover 2-1 through bolts, an extending end of each second piston 2-3 is connected with one end of the second sealing flange 2-4, the other end of the second sealing flange 2-4 is connected with one end of the corresponding second force measuring sensor 2-5, the other end of the second force measuring sensor 2-5 is connected with the second force transmitting plate 2-6, the first force transmitting plate 1-5 penetrates through the second force transmitting plate 2-6, and the first force transmitting sensors 1-4 and the second force transmitting sensors 2-5 are connected with the computer.

Figure 5:
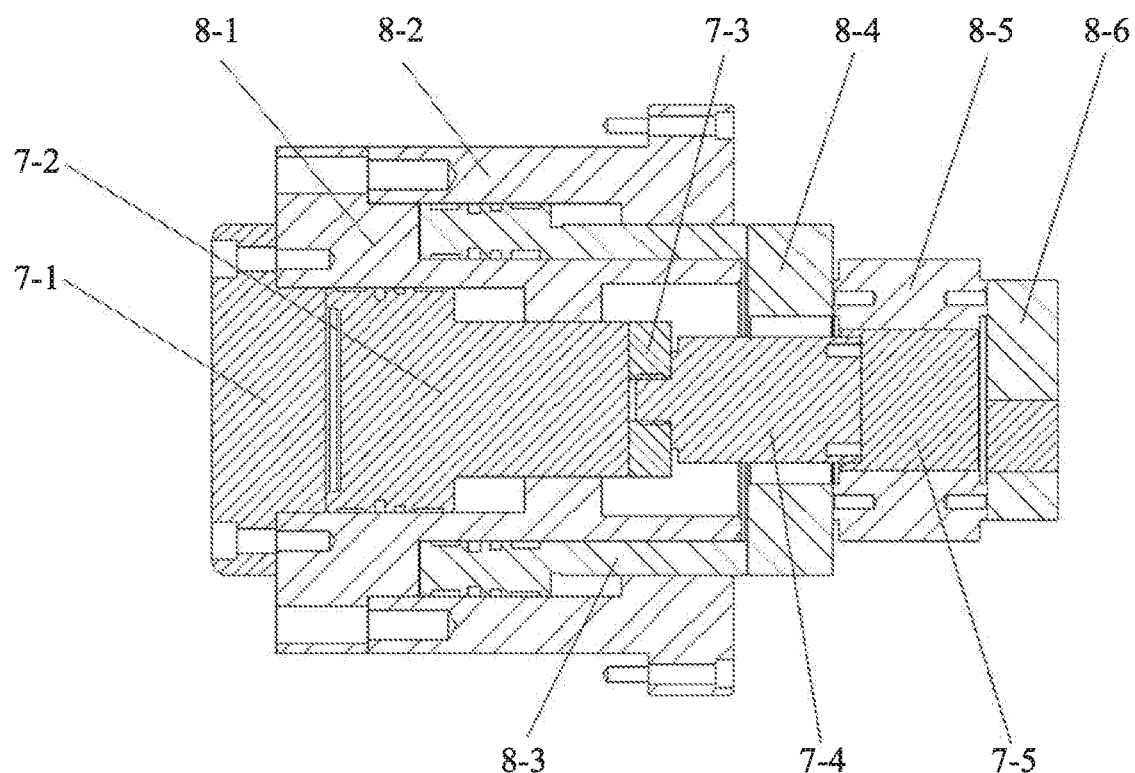
FIG. 5 is a schematic diagram of the structure of a front-end combination lateral loading oil cylinder of the multi-functional true triaxial shear test device for hard rocks with high temperature and high pressure according to the present invention.
Figure 6:
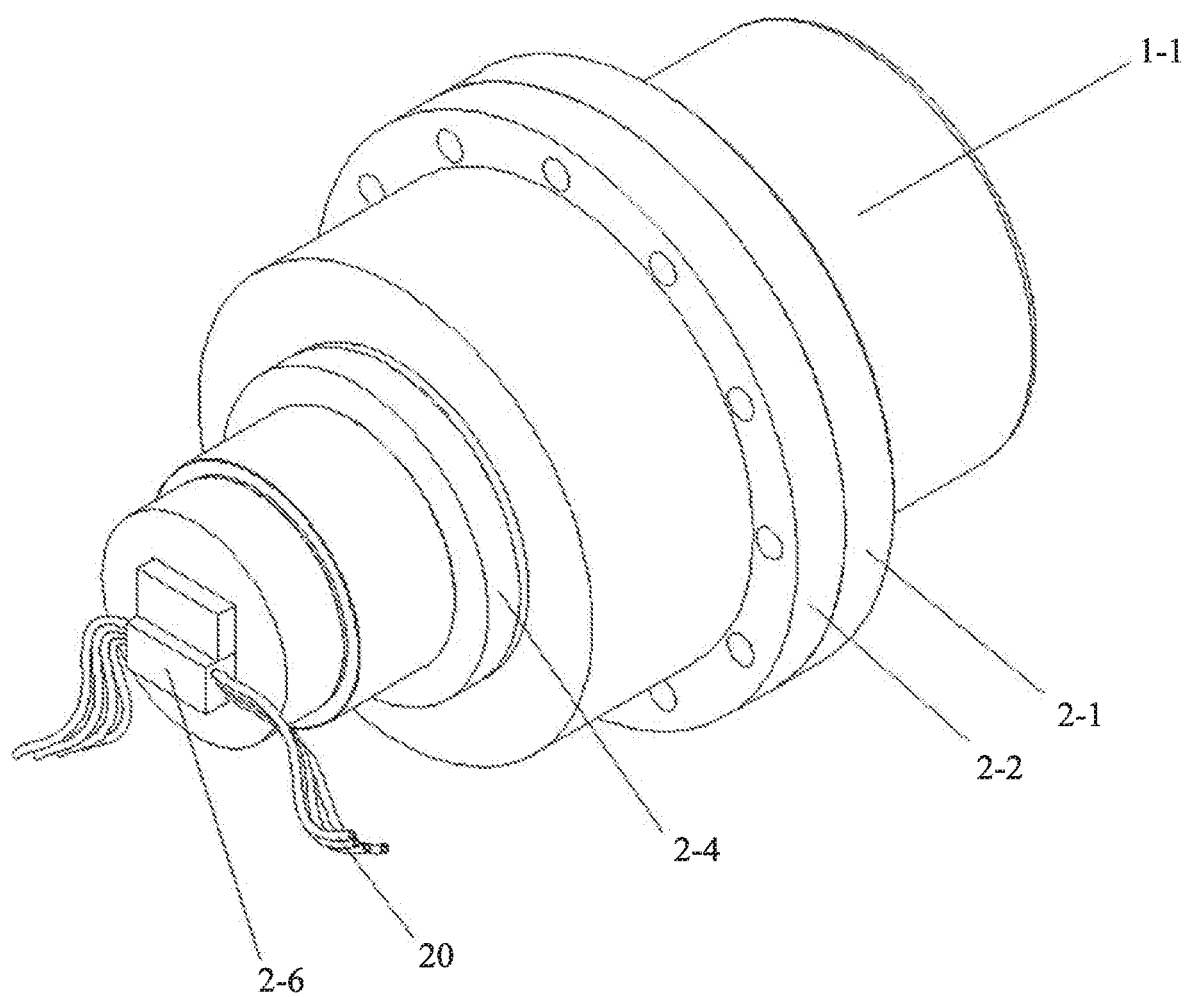
FIG. 6 is a stereogram of the structure of the left-end combination tangential loading oil cylinder of the multi-functional true triaxial shear test device for hard rocks with high temperature and high pressure according to the present invention.

As shown in FIG. 3, the front-end combination lateral loading oil cylinder comprises a front lateral upper loading oil cylinder 8 and a front lateral lower loading oil cylinder 7, and the front lateral lower loading oil cylinder 7 is coaxially mounted at an inner cavity of the front lateral upper loading oil cylinder 8. As shown in FIG. 3, the rear-end combination lateral loading oil cylinder comprises a rear lateral upper loading oil cylinder 10 and a rear lateral lower loading oil cylinder 9, and the rear lateral lower loading oil cylinder 9 is coaxially mounted at an inner cavity of the rear lateral upper loading oil cylinder 10. As shown in FIG. 5, the front lateral upper loading oil cylinder 8 and the rear lateral upper loading oil cylinder 10 are the same in structure and both consist of an upper lateral sealing cover 8-1, an upper lateral counterforce cylinder barrel 8-2, an upper lateral piston 8-3, an upper lateral sealing flange 8-4, an upper lateral force measuring sensor 8-5 and an upper lateral force transmitting plate 8-6. Each upper lateral piston 8-3 is coaxially mounted at a first boss of the corresponding upper lateral sealing cover 8-1, each upper lateral counterforce cylinder barrel 8-2 is coaxially mounted at a second boss of the corresponding upper lateral sealing cover 8-1, an inner surface of each upper lateral counterforce cylinder barrel 8-2 is in contact with an outer surface of the corresponding upper lateral piston 8-3, each upper lateral piston 8-3 is connected with one end of the corresponding upper lateral sealing flange 8-4, the other end of the upper lateral sealing flange 8-4 is connected with one end of the corresponding upper lateral force measuring sensor 8-5, and the other end of the upper lateral force measuring sensor 8-5 is connected with the corresponding upper lateral force transmitting plate 8-6. As shown in FIG. 5, the front lateral lower loading oil cylinder 7 and the rear lateral lower loading oil cylinder 9 are the same in structure and both consist of a lower lateral sealing cover 7-1, a lower lateral piston 7-2, a lower lateral connecting plate 7-3, a lower lateral force measuring sensor 7-4 and a lower lateral force transmitting plate 7-5. One end of each lower lateral sealing cover 7-1 extends into an inner cavity of the corresponding upper lateral sealing cover 8-1, a flange end of each lower lateral sealing cover 7-1 is fixedly mounted on the corresponding upper lateral sealing cover 8-1 through bolts, each lower lateral piston 7-2 is mounted at an inner cavity of the corresponding upper lateral sealing cover 8-1, each lower lateral piston 7-2 is located in a sealing cavity formed by the corresponding upper lateral sealing cover 8-1 and the corresponding lower lateral sealing cover 7-1, a part of each lower lateral piston 7-2 extends out of a boss in the corresponding upper lateral sealing cover 8-1, and is connected with one end of the corresponding lower lateral connecting plate 7-3, the other end of the lower lateral connecting plate 7-3 is connected with one end of the corresponding lower lateral force measuring sensor 7-4, the other end of the lower lateral force measuring sensor 7-4 is connected with the corresponding lower lateral force transmitting plate 7-5, the lower lateral force transmitting plate 7-5 penetrates through the upper lateral force transmitting plate 8-6, and the upper lateral force measuring sensors 8-5 and the lower lateral force measuring sensors 7-4 are both connected with the computer.

As shown in FIG. 2, the upper normal loading oil cylinder 3 consists of an upper normal sealing cover 3-1, an upper normal cylinder barrel 3-2, an upper normal piston 3-3, an upper normal connecting plate 3-4, an upper normal force measuring sensor 3-5 and an upper normal force transmitting plate 3-6. A flange end of the upper normal sealing cover 3-1 is connected with a flange end of the upper normal cylinder barrel 3-2, the upper normal piston 3-3 is arranged on an inner wall of the upper normal cylinder barrel 3-2, a part of the upper normal piston 3-3 extends out of the upper normal cylinder barrel 3-2 and is connected with one end of the upper normal connecting plate 3-4, the other end of the upper normal connecting plate 3-4 is connected with one end of the upper normal force measuring sensor 3-5, the other end of the upper normal force measuring sensor 3-5 is connected with the upper normal force transmitting plate 3-6, and each upper normal force measuring sensor 3-5 is connected with the computer.

As shown in FIG. 2, the lower normal loading oil cylinder 6 consists of a lower normal sealing plate 6-1, a lower normal piston 6-2, a lower normal sealing flange 6-3, a lower normal connecting plate 6-4, a lower normal force measuring sensor 6-5 and a lower normal force transmitting plate 6-6, wherein the lower normal piston 6-2 is arranged in an inner cavity of the lower normal sealing plate 6-1, a flange end of the lower normal sealing plate 6-1 is connected with the lower normal sealing flange 6-3, a part of the lower normal piston 6-2 extends out of the lower normal sealing flange 6-3 and is connected with one end of the lower normal connecting plate, the other end of the lower normal connecting plate 6-4 is connected with one end of the lower normal force measuring sensor 6-5, the other end of the lower normal force measuring sensor 6-5 is connected with the lower normal force transmitting plate 6-6, and each lower normal force measuring sensor 6-5 is connected with the computer.

Two penetrating cooling water through holes are formed in a front end of the first force transmitting plates 1-5 of the left-end combination tangential loading oil cylinder, two penetrating cooling water through holes are formed in a front end of the first force transmitting plates 1-5 of the right-end combination tangential loading oil cylinder, two penetrating cooling water through holes are formed in a front end of the upper lateral force transmitting plate 8-6 of the front-end combination lateral loading oil cylinder, two penetrating cooling water through holes are formed in a front end of the upper lateral force transmitting plate 8-6 of the rear-end combination lateral loading oil cylinder, two penetrating cooling water through holes are formed in a front end of the lower lateral force transmitting plate 7-5 of the front-end combination lateral loading oil cylinder, two penetrating cooling water through holes are formed in a front end of the lower lateral force transmitting plate 7-5 of the rear-end combination lateral loading oil cylinder, two penetrating cooling water through holes are formed in a front end of the upper normal force transmitting plate 3-6 of the upper normal loading oil cylinder 3, and two penetrating cooling water through holes are formed in a front end of the lower normal force transmitting plate 6-6 of the lower normal loading oil cylinder 6. The cooling water through holes are connected with a cooling water device (not shown) through rubber pipes 20 (shown in FIG. 6), and the model of the cooling water device is CF311HC.

As shown in FIGS. 7 and 8, the hydraulic system comprises a first hydraulic station 22, a second hydraulic station 23, a third hydraulic station 24, a first energy accumulator 25, a second energy accumulator 26, a third energy accumulator 27 and a plurality of servo valves 21. As shown in FIG. 7, the first hydraulic station 22 is connected with the first energy accumulator 25 through a high pressure resistant oil pipe, and the first energy accumulator 25 is connected with the left tangential upper loading oil cylinder 1, the left tangential lower loading oil cylinder 2 and the upper normal loading oil cylinder 3 through the high pressure resistant oil pipe and the servo valves 21. As shown in FIG. 7, the second hydraulic station 23 is connected with the second energy accumulator 26 through a high pressure resistant oil pipe, and the second energy accumulator 26 is connected with the right tangential upper loading oil cylinder 5, the right tangential lower loading oil cylinder 4 and the lower normal loading oil cylinder 6 through the high pressure resistant oil pipe and the servo valves 21. As shown in FIG. 8, the third hydraulic station 24 is connected with the third energy accumulator 27 through a high pressure resistant oil pipe, the third energy accumulator 27 is connected with the front lateral upper loading oil cylinder 8 and the front lateral lower loading oil cylinder 7 and the rear lateral upper loading oil cylinder 10 and the rear lateral lower loading oil cylinder 9 through the high pressure resistant oil pipe and the servo valves 21. The first hydraulic station 22, the second hydraulic station 23 and the third hydraulic station 24 are the same in structure and all comprise a hydraulic pump and an oil tank, and an oil inlet of each hydraulic pump is connected with an oil outlet of the corresponding oil tank through the corresponding high pressure resistant oil pipe. Through cooperative effects of the hydraulic pumps and the servo valves 21, high-frequency motion of the actuator is guaranteed, and completion of a constant normal stiffness test is guaranteed. Besides, the hydraulic pumps are connected with a servo driver and cooling water in series, and firstly, when pressure in the oil cylinders is reduced, the servo driver feeds back the pressure in the oil cylinders to the hydraulic pumps in real time, so that the hydraulic pumps work, the pressure in the oil cylinders is complemented, or else, the hydraulic pumps stop working. In addition, when the pressure in the oil cylinders is reduced, the energy accumulators can complement pressure for the oil cylinders continuously. In this manner, continuous temperature rise caused by work of the hydraulic pumps can be reduced, and completion of the long-time constant normal stiffness test can be guaranteed.

As shown in FIGS. 1-3, the test chamber 16 is a thermostatic chamber, and the rock samples 18 in the shear box 17 are heated in a ceramic radiation heating manner.

A multi-functional true triaxial shear test method for hard rocks with high temperature and high pressure for the device, comprises the following steps:

Step 1: loading the rock samples 18 into the shear box 17, and mounting a deformation sensor between the rock samples 18 and the shear box 17.

Step 2: putting the shear box 17 loaded with the rock samples 18 at a central position of the test chamber 16.

Step 3: pushing the lateral auxiliary push-and-pull framework 12 to be away from the annular framework 11, and placing the test chamber 16 at a central position of the lateral auxiliary push-and-pull framework 12.

Step 4: pushing the lateral auxiliary push-and-pull framework 12 into the annular framework 11, enabling the rock samples 18 to be located at a geometric center position of the annular framework 11, and enabling a center connecting line of the upper-end through hole and the lower-end through hole of the annular framework 11 to be perpendicular to a water level; and enabling a center connecting line of the left-end through hole and the right-end through hole of the annular framework 11 to be parallel to the water level, and enabling an intersection point of the two center connecting lines to be a geometric center point of the annular framework 11.

Step 5: completing centering and clamping of the rock samples 18 through performing displacement control on the left tangential upper loading oil cylinder 1, the left tangential lower loading oil cylinder 2, the right tangential upper loading oil cylinder 5, the right tangential lower loading oil cylinder 4, the front lateral upper loading oil cylinder 8, the front lateral lower loading oil cylinder 7, the rear lateral upper loading oil cylinder 10, the rear lateral lower loading oil cylinder 9, the upper normal loading oil cylinder 3 and the lower normal loading oil cylinder 6.

Step 6: starting the cooling water device, so that the cooling water can circulate in the force transmitting plates of the left tangential upper loading oil cylinder 1, the left tangential lower loading oil cylinder 2, the right tangential upper loading oil cylinder 5, the right tangential lower loading oil cylinder 4, the upper normal loading oil cylinder 3 and the lower normal loading oil cylinder 6.

Step 7: starting the test chamber 16, and presetting target temperature so that the temperature in the test chamber 16 can reach the preset target temperature.

Step 8: starting the first hydraulic station 22, the second hydraulic station 23 and the third hydraulic station 24, performing force control on the left tangential upper loading oil cylinder, the left tangential lower loading oil cylinder, the right tangential upper loading oil cylinder, the right tangential lower loading oil cylinder, the front lateral upper loading oil cylinder, the front lateral lower loading oil cylinder, the rear lateral upper loading oil cylinder, the rear lateral lower loading oil cylinder, the upper normal loading oil cylinder and the lower normal loading oil cylinder at constant loading rate through force control, so that values $\tau = \sigma_p = \sigma_n$ of six boundary surfaces of the rock samples under a hydrostatic pressure state are increased to a target value of normal stress $\sigma_{n1}$, wherein i is shear stress, $\sigma_p$ is lateral stress, and $\sigma_n$ is normal stress.

Step 9: performing servo control on the upper normal loading oil cylinder 3 and the lower normal loading oil cylinder 6 so as to guarantee the normal stress unchanged; and then performing force control on the left tangential upper loading oil cylinder 1, the left tangential lower loading oil cylinder 2, the right tangential upper loading oil cylinder 5, the right tangential lower loading oil cylinder 4, the front lateral upper loading oil cylinder 8, the front lateral lower loading oil cylinder 7, the rear lateral upper loading oil cylinder 10 and the rear lateral lower loading oil cylinder 9 at constant loading rate through force control, so that a stress of a shear surface and a stress of a lateral surface are increased to a target value of the lateral stress $\sigma_{p1}$.

Step 10: performing servo control on the front lateral upper loading oil cylinder 8, the front lateral lower loading oil cylinder 7, the rear lateral upper loading oil cylinder 10, the rear lateral lower loading oil cylinder 9, the upper normal loading oil cylinder 3 and the lower normal loading oil cylinder 6 so as to guarantee the lateral stress and the normal stress not to be unchanged; and then performing force control on the left tangential upper loading oil cylinder 1, the left tangential lower loading oil cylinder 2, the right tangential upper loading oil cylinder 5 and the right tangential lower loading oil cylinder 4 at constant loading rate through force control, so that the stress of the shear surface is increased to the stress $\tau_0$ of primary rocks.

Step 11: performing servo control on the front lateral upper loading oil cylinder 8, the front lateral lower loading oil cylinder 7, the rear lateral upper loading oil cylinder 10, the rear lateral lower loading oil cylinder 9, the upper normal loading oil cylinder 3 and the lower normal loading oil cylinder 6 so as to guarantee the lateral stress and the normal stress unchanged; and besides, performing servo control on the left tangential lower loading oil cylinder 2 and the right tangential upper loading oil cylinder 5, so that a force bearing process of the rock samples 18 in a shear direction is guaranteed, and a left lower cross section and a right upper cross section maintain the stress $\tau_0$ of the primary rocks; and then increasing shear force of the left tangential upper loading oil cylinder 1 and the right tangential lower loading oil cylinder 4 at constant loading rate through displacement control until the shear force reaches residual strength.

Step 12: enabling an interface of the computer to be connected with the force measuring sensors and the displacement sensors 19, feeding back real-time signals to the computer through the force measuring sensors and the displacement sensors 19, and recording displacement, force value data and a rock sample macroscopic breaking mode through the computer.

What is claimed is:

1. A multi-functional true triaxial shear test device for hard rocks with high temperature and high pressure, comprising a hydraulic system, a left-end combination tangential loading oil cylinder, a right-end combination tangential loading oil cylinder, a front-end combination lateral loading oil cylinder, a rear-end combination lateral loading oil cylinder, an upper normal loading oil cylinder, a lower normal loading oil cylinder, an annular framework, a lateral auxiliary push-and-pull framework, an annular framework support platform, a horizontal support platform and a test chamber;

wherein the annular framework is fixedly mounted on an upper surface of the annular framework support platform through bolts, the horizontal support platform is arranged at a rear end of the annular framework support platform, and the horizontal support platform and the annular framework support platform are both fixedly mounted on a ground;

wherein the lateral auxiliary push-and-pull framework is arranged on the horizontal support platform through a guide rail and a sliding block;

wherein the left-end combination tangential loading oil cylinder is mounted in a left-end through hole of the annular framework, the right-end combination tangential loading oil cylinder is mounted in a right-end through hole of the annular framework, the upper normal loading oil cylinder is arranged in an upper-end through hole of the annular framework, and the lower normal loading oil cylinder is arranged in a lower-end through hole of the annular framework;

wherein the front-end combination lateral loading oil cylinder is mounted in a front-end through hole of the lateral auxiliary push-and-pull framework, and the rear-end combination lateral loading oil cylinder is arranged in a rear-end through hole of the lateral auxiliary push-and-pull framework;

wherein a plurality of displacement sensors are respectively arranged at a rear end of the left-end combination tangential loading oil cylinder, a rear end of the right-end combination tangential loading oil cylinder, a rear end of the front-end combination lateral loading oil cylinder, a rear end of the rear-end combination lateral loading oil cylinder and a rear end of the upper normal loading oil cylinder;

wherein the left-end combination tangential loading oil cylinder, the right-end combination tangential loading oil cylinder, the front-end combination lateral loading oil cylinder, the rear-end combination lateral loading oil cylinder, the upper normal loading oil cylinder and the lower normal loading oil cylinder are respectively connected with the hydraulic system; and wherein the test chamber is mounted in a rectangular through hole of the lateral auxiliary push-and-pull framework, a shear box is placed in the test chamber, and rock samples are placed in the shear box.

2. The device according to claim 1, wherein the left-end combination tangential loading oil cylinder comprises a left tangential upper loading oil cylinder and a left tangential lower loading oil cylinder, and the left tangential lower loading oil cylinder is coaxially mounted on the left tangential upper loading oil cylinder; wherein the right-end combination tangential loading oil cylinder comprises a right tangential upper loading oil cylinder and a right tangential lower loading oil cylinder, and the right tangential upper loading oil cylinder is coaxially mounted on the right tangential lower loading oil cylinder; wherein the left tangential upper loading oil cylinder and the right tangential lower loading oil cylinder are the same in structure, and both consist of a first sealing cover, a first piston, a first connecting plate, a first force measuring sensor and a first force transmitting plate; wherein each first piston is arranged in an inner cavity of the corresponding first sealing cover, each first piston is connected with one end of the corresponding first connecting plate, the other end of the first connecting plate is connected with one end of the corresponding first force measuring sensor, and the other end of the first force measuring sensor is connected with the corresponding first force transmitting plate; wherein the left tangential lower loading oil cylinder and the right tangential upper loading oil cylinder are the same in structure and both consist of a second sealing cover, a second counterforce cylinder barrel, a second piston, a second sealing flange, a second force measuring sensor and a second force transmitting plate; and wherein each second sealing cover is coaxially mounted on an outer peripheral surface of the corresponding first piston, a boss at one end of each second sealing cover extends into the inner cavity of the corresponding first sealing cover to be in connection with the corresponding first sealing cover in a sealed manner, each second piston and the corresponding second counterforce cylinder barrel are coaxially mounted at the other end of the corresponding second sealing cover, each second counterforce cylinder barrel is coaxially mounted on an outer periphery surface of the corresponding second piston and is fixedly mounted on the corresponding second sealing cover through bolts, an extending end of each second piston is connected with one end of the second sealing flange, the other end of the second sealing flange is connected with one end of the corresponding second force measuring sensor, the other end of the second force measuring sensor is connected with the second force transmitting plate, and each first force transmitting plate penetrates through the corresponding second force transmitting plate.

3. The device according to claim 1, wherein the front-end combination lateral loading oil cylinder comprises a front lateral upper loading oil cylinder and a front lateral lower loading oil cylinder, and the front lateral lower loading oil cylinder is coaxially mounted at an inner cavity of the front lateral upper loading oil cylinder; wherein the rear-end combination lateral loading oil cylinder comprises a rear lateral upper loading oil cylinder and a rear lateral lower loading oil cylinder, and the rear lateral lower loading oil cylinder is coaxially mounted at an inner cavity of the rear lateral upper loading oil cylinder; wherein the front lateral upper loading oil cylinder and the rear lateral upper loading oil cylinder are the same in structure and both consist of an upper lateral sealing cover, an upper lateral counterforce cylinder barrel, an upper lateral piston, an upper lateral sealing flange, an upper lateral force measuring sensor and an upper lateral force transmitting plate; wherein each upper lateral piston is coaxially mounted at a first boss of the corresponding upper lateral sealing cover, each upper lateral counterforce cylinder barrel is coaxially mounted at a second boss of the corresponding upper lateral sealing cover, an inner surface of each upper lateral counterforce cylinder barrel is in contact with an outer surface of the corresponding upper lateral piston, each upper lateral piston is connected with one end of the corresponding upper lateral sealing flange, the other end of the upper lateral sealing flange is connected with one end of the corresponding upper lateral force measuring sensor, and the other end of the upper lateral force measuring sensor is connected with the corresponding upper lateral force transmitting plate; wherein the front lateral lower loading oil cylinder and the rear lateral lower loading oil cylinder are the same in structure and both consist of a lower lateral sealing cover, a lower lateral piston, a lower lateral connecting plate, a lower lateral force measuring sensor and a lower lateral force transmitting plate; and wherein one end of each lower lateral sealing cover extends into an inner cavity of the corresponding upper lateral sealing cover, a flange end of each lower lateral sealing cover is fixedly mounted on the corresponding upper lateral sealing cover through bolts, each lower lateral piston is mounted at an inner cavity of the corresponding upper lateral sealing cover, each lower lateral piston is located in a sealing cavity formed by the corresponding upper lateral sealing cover and the corresponding lower lateral sealing cover, a part of each lower lateral piston extends out of a boss in the corresponding upper lateral sealing cover, and is connected with one end of the corresponding lower lateral connecting plate, the other end of the lower lateral connecting plate is connected with one end of the corresponding lower lateral force measuring sensor, the other end of the lower lateral force measuring sensor is connected with the corresponding lower lateral force transmitting plate, and each lower lateral force transmitting plate penetrates through the corresponding upper lateral force transmitting plate.

4. The device according to claim 1, wherein the upper normal loading oil cylinder consists of an upper normal sealing cover, an upper normal cylinder barrel, an upper normal piston, an upper normal connecting plate, an upper normal force measuring sensor and an upper normal force transmitting plate; and wherein a flange end of the upper normal sealing cover is connected with a flange end of the upper normal cylinder barrel, the upper normal piston is arranged on an inner wall of the upper normal cylinder barrel, a part of the upper normal piston extends out of the upper normal cylinder barrel, and is connected with one end of the upper normal connecting plate, the other end of the upper normal connecting plate is connected with one end of the upper normal force measuring sensor, and the other end of the upper normal force measuring sensor is connected with the upper normal force transmitting plate.

5. The device according to claim 1, wherein the lower normal loading oil cylinder consists of a lower normal sealing plate, a lower normal piston, a lower normal sealing flange, a lower normal connecting plate, a lower normal force measuring sensor and a lower normal force transmitting plate; and wherein the lower normal piston is arranged in an inner cavity of the lower normal sealing plate, a flange end of the lower normal sealing plate is connected with the lower normal sealing flange, a part of the lower piston extends out of the lower normal sealing flange, and is connected with one end of the lower normal connecting plate, the other end of the lower normal connecting plate is connected with one end of the lower normal force measuring sensor, and the other end of the lower normal force measuring sensor is connected with the lower normal force transmitting plate.

6. The device according to claim 1, wherein two penetrating cooling water through holes are formed in a front end of a first force transmitting plate of the left-end combination tangential loading oil cylinder, two penetrating cooling water through holes are formed in a front end of a first force transmitting plate of the right-end combination tangential loading oil cylinder, two penetrating cooling water through holes are formed in a front end of an upper lateral force transmitting plate of the front-end combination lateral loading oil cylinder, two penetrating cooling water through holes are formed in a front end of an upper lateral force transmitting plate of the rear-end combination lateral loading oil cylinder, two penetrating cooling water through holes are formed in a front end of a lower lateral force transmitting plate of the front-end combination lateral loading oil cylinder, two penetrating cooling water through holes are formed in a front end of a lower lateral force transmitting plate of the rear-end combination lateral loading oil cylinder, two penetrating cooling water through holes are formed in a front end of an upper normal force transmitting plate of the upper normal loading oil cylinder, and two penetrating cooling water through holes are formed in a front end of a lower normal force transmitting plate of the lower normal loading oil cylinder; and wherein the cooling water through holes are connected with a cooling water device through rubber pipes.

7. The device according to claim 1, wherein the hydraulic system comprises a first hydraulic station, a second hydraulic station, a third hydraulic station, a first energy accumulator, a second energy accumulator, a third energy accumulator and a plurality of servo valves; wherein the first hydraulic station is connected with the first energy accumulator through a high pressure oil resistant pipe, and the first energy accumulator is connected with a left tangential upper loading oil cylinder, a left tangential lower loading oil cylinder and the upper normal loading oil cylinder through the high pressure resistant oil pipe and the servo valves; wherein the second hydraulic station is connected with the second energy accumulator through a high pressure resistant oil pipe, and the second energy accumulator is connected with a right tangential upper loading oil cylinder, a right tangential lower loading oil cylinder and the lower normal loading oil cylinder through the high pressure resistant oil pipe and the servo valves; wherein the third hydraulic station is connected with the third energy accumulator through a high pressure resistant oil pipe, the third energy accumulator is connected with a front lateral upper loading oil cylinder and a front lateral lower loading oil cylinder and a rear lateral upper loading oil cylinder and a rear lateral lower loading oil cylinder through the high pressure resistant oil pipe and the servo valves; and wherein the first hydraulic station, the second hydraulic station and the third hydraulic station are the same in structure and all comprise a hydraulic pump and an oil tank, and an oil inlet of each hydraulic pump is connected with an oil outlet of the corresponding oil tank through the corresponding high pressure resistant oil pipe.

8. The device according to claim 1, wherein the test chamber is a thermostatic chamber, and the rock samples in the shear box are heated in a ceramic radiation heating manner.

9. A multi-functional true triaxial shear test method for hard rocks with high temperature and high pressure for the device according to claim 1, comprising the following steps:
step 1: loading the rock samples into the shear box, and mounting a deformation sensor between the rock samples and the shear box;
step 2: putting the shear box loaded with the rock samples at a central position of the test chamber;
step 3: pushing the lateral auxiliary push-and-pull framework to be away from the annular framework, and placing the test chamber at a central position of the lateral auxiliary push-and-pull framework;
step 4: pushing the lateral auxiliary push-and-pull framework into the annular framework, and enabling the rock samples to be located at a geometric center position of the annular framework;
step 5: completing centering and clamping of the rock samples through performing displacement control on a left tangential upper loading oil cylinder, a left tangential lower loading oil cylinder, a right tangential upper loading oil cylinder, a right tangential lower loading oil cylinder, a front lateral upper loading oil cylinder, a front lateral lower loading oil cylinder, a rear lateral upper loading oil cylinder, a rear lateral lower loading oil cylinder, the upper normal loading oil cylinder and the lower normal loading oil cylinder;
step 6: starting a cooling water device, so that the cooling water can circulate in force transmitting plates of the left tangential upper loading oil cylinder, the left tangential lower loading oil cylinder, the right tangential upper loading oil cylinder, the right tangential lower loading oil cylinder, the upper normal loading oil cylinder and the lower normal loading oil cylinder;
step 7: starting the test chamber, and presetting target temperature so that the temperature in the test chamber can reach the preset target temperature;
step 8: starting a first hydraulic station, a second hydraulic station and a third hydraulic station, performing force control on the left tangential upper loading oil cylinder, the left tangential lower loading oil cylinder, the right tangential upper loading oil cylinder, the right tangential lower loading oil cylinder, the front lateral upper loading oil cylinder, the front lateral lower loading oil cylinder, the rear lateral upper loading oil cylinder, the rear lateral lower loading oil cylinder, the upper normal loading oil cylinder and the lower normal loading oil cylinder at constant loading rate through force control, so that values $\tau=\sigma_p=\sigma_n$ of six boundary surfaces of the rock samples under a hydrostatic pressure state are increased to a target value of normal stress $\sigma_{n1}$, wherein $\tau$ is shear stress, $\sigma_n$ is lateral stress, and $\sigma_n$ is normal stress;

step 9: performing servo control on the upper normal loading oil cylinder and the lower normal loading oil cylinder so as to guarantee the normal stress unchanged; and then performing force control on the left tangential upper loading oil cylinder, the left tangential lower loading oil cylinder, the right tangential upper loading oil cylinder, the right tangential lower loading oil cylinder, the front lateral upper loading oil cylinder, the front lateral lower loading oil cylinder, the rear lateral upper loading oil cylinder and the rear lateral lower loading oil cylinder at constant loading rate through force control, so that a stress of a shear surface and a stress of a lateral surface are increased to a target value of the lateral stress $\sigma_{p1}$;

step 10: performing servo control on the front lateral upper loading oil cylinder, the front lateral lower loading oil cylinder, the rear lateral upper loading oil cylinder, the rear lateral lower loading oil cylinder, the upper normal loading oil cylinder and the lower normal loading oil cylinder so as to guarantee the lateral stress and the normal stress unchanged; and then performing force control on the left tangential upper loading oil cylinder, the left tangential lower loading oil cylinder, the right tangential upper loading oil cylinder and the right tangential lower loading oil cylinder at constant loading rate through force control, so that the stress of the shear surface is increased to a stress $\tau_0$ of primary rocks;

step 11: performing servo control on the front lateral upper loading oil cylinder, the front lateral lower loading oil cylinder, the rear lateral upper loading oil cylinder, the rear lateral lower loading oil cylinder, the upper normal loading oil cylinder and the lower normal loading oil cylinder so as to guarantee the lateral stress and the normal stress unchanged; and besides, performing servo control on the left tangential lower loading oil cylinder and the right tangential upper loading oil cylinder, so that a force bearing process of the rock samples in a shear direction is guaranteed, and a left lower cross section and a right upper cross section maintain the stress $\tau_0$ of the primary rocks; and then increasing shear force of the left tangential upper loading oil cylinder and the right tangential lower loading oil cylinder at constant loading rate through displacement control until the shear force reaches residual strength; and step 12: recording displacement, force value data and a rock sample macroscopic breaking mode through a computer.

* * * * *